(12) United States Patent
Subramaniam

(10) Patent No.: US 7,868,479 B2
(45) Date of Patent: Jan. 11, 2011

(54) POWER GATING FOR MULTIMEDIA PROCESSING POWER MANAGEMENT

(75) Inventor: Vijay Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 11/769,596

(22) Filed: Jun. 27, 2007

(65) Prior Publication Data

US 2009/0001814 A1 Jan. 1, 2009

(51) Int. Cl.
*H02J 1/00* (2006.01)
(52) U.S. Cl. .......................................... 307/39; 307/38
(58) Field of Classification Search ................... 307/38, 307/39
See application file for complete search history.

(56) References Cited

U.S. PATENT DOCUMENTS

| 5,615,162 | A * | 3/1997 | Houston ...................... 365/226 |
| 5,926,034 | A | 7/1999 | Seyyedy |
| 6,516,447 | B2 | 2/2003 | Wadland et al. |
| 6,518,826 | B2 * | 2/2003 | Zhang ......................... 327/534 |
| 6,639,454 | B2 * | 10/2003 | Hoshi et al. .................. 327/544 |
| 6,653,693 | B1 | 11/2003 | Makino |
| 6,900,478 | B2 | 5/2005 | Miyagi |
| 7,076,681 | B2 * | 7/2006 | Bose et al. ................... 713/600 |
| 2002/0191104 | A1 * | 12/2002 | Matsutani et al. ........... 348/441 |
| 2003/0094661 | A1 | 5/2003 | Miyagi |
| 2003/0112042 | A1 | 6/2003 | Takahashi |
| 2003/0218478 | A1 * | 11/2003 | Sani et al. ...................... 326/33 |
| 2004/0026751 | A1 | 2/2004 | Makino |
| 2005/0276132 | A1 | 12/2005 | Severson et al. |
| 2006/0206737 | A1 | 9/2006 | Lee |
| 2006/0270427 | A1 | 11/2006 | Shida et al. |
| 2006/0282826 | A1 | 12/2006 | Dockser |
| 2009/0137221 | A1 | 5/2009 | Nanda et al. |

OTHER PUBLICATIONS

Benton H. Calhoun et al., "Design methodology for fine-grained leakage control in MTCMOS" Proceedings of the 2003 International Symposium on Low Power Electronics and Design, ISLPED'03. Seoul, Korea, Aug. 25-27, 2003; [International Symposium on Low Power Elctronics and Design], 20030825; 20030825-20030827 New York, NY: ACM, US pp. 104-109 XP010658596.
International Search Report and Written Opinion—PCT/US2008/067985, International Search Authority— European Patent Office—Dec. 7, 2009.

* cited by examiner

*Primary Examiner*—Hal I. Kaplan
(74) *Attorney, Agent, or Firm*—James R. Gambale, Jr.

(57) ABSTRACT

Circuitry for implementation of power gating within a multimedia processing environment is described. The disclosed circuitry supports effective power management for a multimedia display processor, which may include various components that operate separately from one another. In this manner, the disclosed circuitry can support power conservation and enhanced performance within a multimedia processing environment. In some aspects, headswitch or footswitch circuitry may be implemented to selectively connect and disconnect different logic components of a multimedia display processor to a power rail depending on the operating mode of the respective logic component, e.g., depending on whether the logic component is in an active or inactive mode.

35 Claims, 8 Drawing Sheets

POWER GATING FOR MULTIMEDIA PROCESSING POWER MANAGEMENT

TECHNICAL FIELD

The disclosure relates to integrated circuits and, more particularly, to power management for integrated circuits.

BACKGROUND

Electronic devices incorporating integrated circuits, such as application specific integrated circuits (ASICs), often employ power saving techniques to reduce power consumption and thereby achieve extended battery life. Small, portable devices such as mobile telephones and personal digital assistants (PDAs), for example, typically incorporate circuitry for implementing inactive modes to limit power consumption by logic circuitry. Inactive modes may include stand-by, low power and sleep modes.

Power dissipation in digital circuits, and more specifically in CMOS circuits, is approximately proportional to the square of the supply voltage. Therefore, the most effective way to achieve low-power performance is to scale down the supply voltage. CMOS circuits on ASICs are capable of operating at significantly reduced power levels. In order to avoid increases in propagation delay, however, the threshold voltage of the CMOS devices also is reduced.

The reduction in threshold voltage generally causes an increase in stand-by current due to changes in the sub-threshold leakage current of the MOS devices. The leakage current that flows through an "off" transistor tends to increase exponentially as the threshold voltage of a device is reduced. Moreover, as manufacturing technology evolves to a higher level of integration and the minimum feature capable of being manufactured becomes smaller and smaller, e.g., 90 nm, 65 nm or 45 nm and lower, going to nanotechnology level, gate leakage and sub-threshold leakage become even more problematic. Therefore, electronic devices such as mobile telephones and PDAs that remain in an inactive mode for an extended period of time can exhibit significant leakage current, and cause undesirable drain on battery power during the inactive mode.

SUMMARY

In general, this disclosure is directed to circuitry for implementation of power gating within a multimedia processing environment. The disclosed circuitry supports more effective power management for a multimedia display processor, which may include various components that operate separately from one another. In this manner, the disclosed circuitry can support power conservation and enhanced performance within a multimedia processing environment.

In order to reduce leakage current during stand-by modes, some application specific integrated circuits (ASICs) may include headswitches or footswitches that are electrically connected between the low voltage threshold (LVT) logic gates of a CMOS circuit and the power rail or ground rail. A headswitch is a high voltage threshold (HVT) PMOS transistor that stands between the local power mesh routing of an ASIC core or block and the top-level power mesh routing. A footswitch is an HVT NMOS transistor that stands between the local ground mesh routing and the top-level ground rail/mesh.

During an inactive mode, the headswitches or footswitches are turned off to disconnect the LVT logic gates from the power/ground supply and thereby "collapse" the power rail. Because the headswitch or footswitch has a high threshold voltage, the amount of leakage current drawn from the power supply by the headswitch or footswitch is substantially reduced relative to the leakage current that would otherwise flow through the LVT logic gates. During an active mode, the headswitches or footswitches are turned on to connect the power supply and ground to the LVT gates. Therefore, during an active mode, the LVT logic gates are powered by substantially the same voltage as if they were directly connected to the power supply and ground.

In some aspects of this disclosure, headswitch or footswitch circuitry may be implemented to independently and selectively connect and disconnect different logic components of a multimedia display processor to a power rail depending on the operating mode of the respective logic component, e.g., depending on whether the logic component is in an active or inactive mode. Distributing switches between the logic gates and the power rail or ground rail may have particular advantage in electronic devices with an inactive mode in which part of a multimedia display processor may continue to operate while other circuits within the multimedia display processor are turned off or are in a low power state. In particular, distributed switches can be individually controlled to decouple the supply voltage from selected regions, blocks or rows of a multimedia display processor.

The circuitry described in this disclosure may be applicable to a variety of electronic devices, but may be especially useful in small, portable wireless communication devices that perform multimedia processing and that rely on inactive circuit modes to conserve battery power. For example, the circuitry may be applied to wireless devices such as mobile telephones and personal digital assistants (PDAs). As another example, the circuitry described herein may be used in non-wireless devices.

In one aspect, the disclosure provides a multimedia processor comprising a first block for processing first multimedia processing tasks, a second block for processing second multimedia processing tasks, a power source that generates power for the first and second blocks, and a power gating module that selectively couples and decouples the first block to and from the power source independently of the second block.

In another aspect, the disclosure provides a wireless communication device comprising a wireless transmitter, a wireless receiver, and a processing circuit to drive the transmitter and process signals received by the wireless receiver, the processing circuit including a multimedia display processor having a first block for processing first multimedia processing tasks, a second block for processing second multimedia processing tasks, a power source that generates power for the first and second blocks, and a power gating module that selectively couples and decouples the first block to and from the power source independently of the second block.

In a further aspect, the disclosure provides a method comprising detecting that a processing block within a multimedia display processor is idling, and selectively decoupling the processing block to a power source to independently gate power to the processing block when the processing block is idling without decoupling other active processing blocks within the multimedia display processor from the power source.

In yet another aspect, the disclosure provides a computer program product, comprising computer-readable media comprising instructions for causing a computer to detect that a processing block within a multimedia display processor is idling, and instructions for causing a computer to selectively decouple the processing block to a power source to independently gate power to the processing block when the processing block is idling without decoupling other active processing blocks within the multimedia display processor from the power source.

In another aspect, the disclosure provides a method for assembling a multimedia processor, the method comprising forming a logic circuit including a first block for independently processing first multimedia processing tasks and a second block for independently processing second multimedia processing tasks, forming a power source that generates power for the first and second blocks, and forming a power gating module that selectively couples and decouples the first block to and from the power source independently of the second block.

In a further aspect, the disclosure provides a multimedia processor comprising means for processing first multimedia processing tasks, means for processing second multimedia processing tasks, means for generating power for the first and second blocks, and means for selectively coupling and decoupling the means for processing first multimedia processing tasks to and from the means for generating power independently of the means for processing second multimedia processing tasks.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. Accordingly, this disclosure also contemplates a computer-readable medium comprising instructions that upon execution cause the device to perform techniques as described in this disclosure. In some cases, the computer readable medium may form part of a computer program product comprising computer readable medium.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
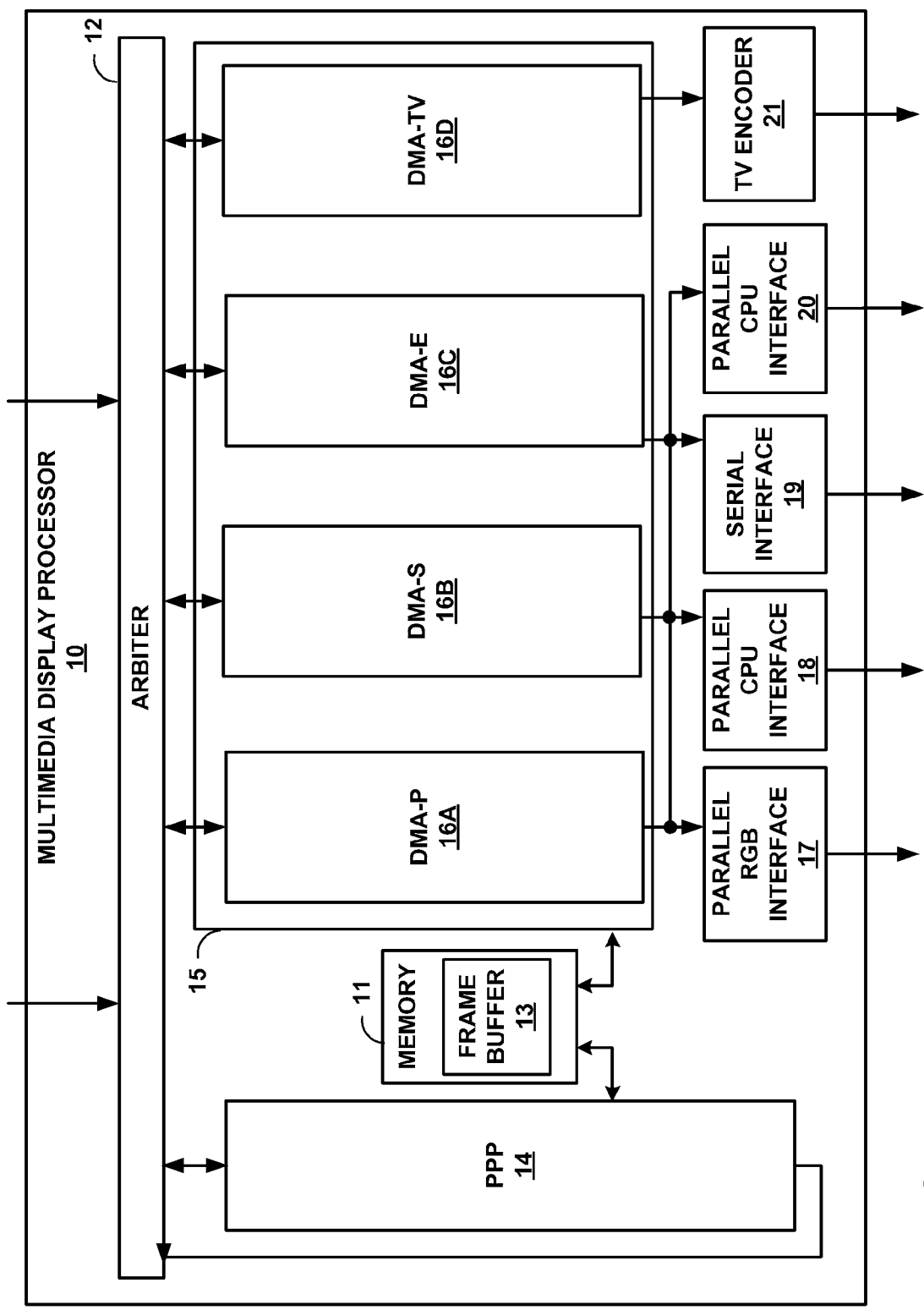
FIG. 1 is a block diagram illustrating an example multimedia display processor.

FIG. 1 is a block diagram illustrating an example multimedia display processor 10. Multimedia display processor 10 may be part of a hard macro core within an application specific integrated circuit (ASIC) or system on a chip (SOC). The hard macro core may be a logic function that specifies the manner in which logic elements of the ASIC or SOC are interconnected, and specifies the physical pathways and wiring patterns between the logic elements. For example, the hard macro core may comprise memory blocks, digital signal processor (DSP) circuitry, custom processor cores, or any other hardened intellectual property (IP) cores. Multimedia display processor 10 may be part of a battery operated portable electronic device. The techniques described herein may be particularly advantageous in portable electronic devices such as a mobile phone, personal digital assistant (PDA), or other such devices with a sleep or stand-by mode in which parts of the multimedia display processor continues to operate while some parts of the multimedia display processor are turned off or are in a low power state.

Multimedia display processor 10 includes an arbiter 12 for balancing processing requests among a plurality of logic components within multimedia display processor 10. The logic components include a pixel processing pipe (PPP) 14 and a plurality of direct memory access (DMA) pipes, namely, a primary DMA (DMA-P) 16A, a secondary DMA (DMA-S) 16B, an external DMA (DMA-E) 16C, and a television DMA (DMA-TV) 16D. DMAs 16A-16D (DMAs 16) are hardware elements that have direct memory access to a memory (e.g., memory 11), and move a frame buffer image from the memory to a display panel.

In the example of FIG. 1, multimedia display processor 10 also includes interfaces for connecting to different types of displays, such as a parallel red-green-blue (RGB) interface 17, a parallel CPU interface 18, a serial interface 19, a parallel CPU interface 20, and a TV encoder 21. Parallel RGB interface 17 connects to a frame-bufferless LCD panel. Parallel CPU interface 18 connects to a display panel with a frame buffer. Serial interface 19 serially connects to a display panel with a frame buffer. TV encoder 21 connects to a television display.

PPP 14 may be used for processing pixels for color conversion, up-scaling/downscaling images, blending, chroma up-sampling/downsampling, and blending of multiple image planes to compose a frame buffer in memory. For example, PPP 14 may integrate video, graphics, icons, or other multimedia objects on distinct image planes into a single frame buffer. The multimedia objects may originate from different software applications. In one aspect, as shown in FIG. 1, frame buffer 13 may be stored in memory 11 as part of multimedia display processor 10. In other aspects, the frame buffer may be stored in external synchronous dynamic random access memory (SDRAM) memory or system memory. DMAs 16A-16D ("DMAs 16") access the frame buffer 13 and sends the frame buffer 13 to a display panel (not shown) for display. The display panel may be a liquid crystal display (LCD), a television display, a parallel or serial display, or other display.

Multimedia display processor 10 may be thought of as functionally divided into two separate blocks for processing multimedia tasks: PPP 14 and DMA block 15. DMA block 15 is composed of a plurality of sub-blocks, i.e., DMAs 16A-16D. The architecture of multimedia display processor 10 shown in FIG. 1 enables multimedia display processor 10 to use PPP 14 at different frame composition rates than the display update rate. In addition, each of DMAs 16 may operate at different display update rates. PPP 14 is preferably sized to handle worst-case performance requirements, i.e., to support all of DMAs 16 running simultaneously, and to enable hardware intellectual property (IP) reuse for many system on a chip (SOC) platforms. However, there are many usage scenarios and SOC platforms in which not all parts of multimedia display processor 10 are needed to accomplish a given task.

As described in further detail below, power may be selectively and independently gated to the logic components of multimedia display processor 10, i.e., PPP 14 and one or more sub-blocks of DMA block 15, thereby reducing the amount of leakage current during inactive modes of the logic components. For example, multimedia display processor 10 may be incorporated into a high-end product that uses all of the logic components present within multimedia display processor 10, or may be incorporated into a low-end product that uses only a subset of the logic components present within multimedia display processor 10. In the case of the low-end product, the logic components not being used may independently have power gated off. The independent power gating may be achieved by associating individual switches with each of the respective ones of PPP 14 and DMAs 16. For example, a footswitch or headswitch may be used. In particular, when a component (e.g., a software component) detects that one of logic components 14, 16 is inactive (idling), the component may cause the respective switch to turn off to put the logic component in an inactive mode. The amount of leakage current drawn from the power rail in an inactive mode may be reduced because the switch has a high threshold voltage and there is no current flowing through the respective logic component. In addition, the techniques described herein may also reduce current consumed by components that are not clock gated.

Figure 2:
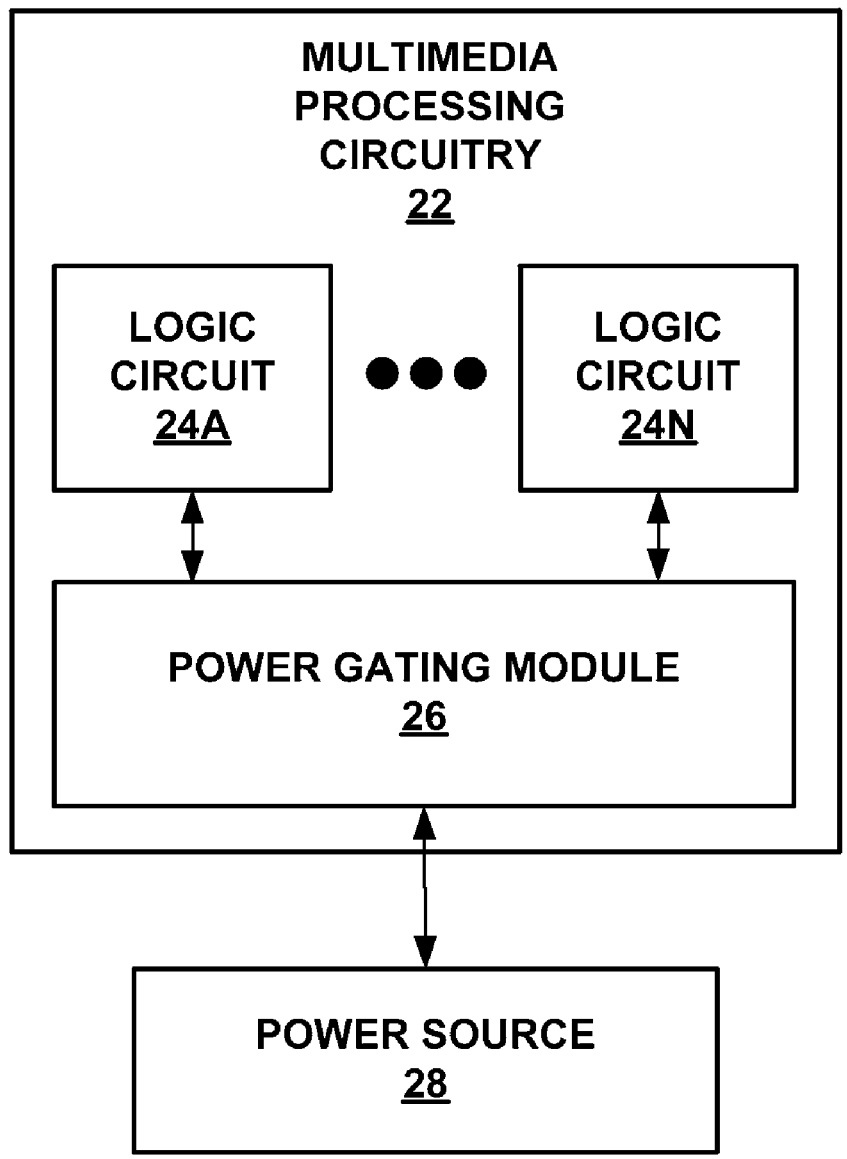
FIG. 2 is a block diagram illustrating an example multimedia processing circuitry and power source that operate according to the techniques of this disclosure.

FIG. 2 is a block diagram illustrating an example multimedia processing circuitry 22 and power source 28 that operate according to the techniques of this disclosure. Multimedia processing circuitry 22 includes logic circuits 24A-24N ("logic circuits 24"). Logic circuits 24 may independently process different multimedia processing tasks. Power source 28 generates power for each of logic circuits 24A-24N. Power gating module 26 selectively couples and decouples logic circuits 24 to power source 28. Power gating module 26 may perform this coupling and decoupling on an independent basis for each of logic circuits 24A-24N. For example, power gating module 26 may couple and decouple logic circuit 24A to and from power source 28 independently of coupling and decoupling logic circuit 24N from power source 28. As another example, rather than independently coupling each of logic circuits 24, power gating module 26 may couple and decouple various groupings or combinations of individual logic circuits 24 from power source 28.

Power gating module 26 may include a plurality of switch cells (not shown) each associated with a different one of logic circuits 24A-24N. Power gating module 26 may also include a driver module (not shown) or an intermediate software intelligence layer that independently controls the plurality of switch cells to selectively couple and decouple the individual logic circuits 24 to power source 28.

Power source 28 may include a power rail in communication with logic circuits 24, and a ground rail in communication with logic circuits 24. Power gating module 26 may independently control the plurality of switch cells to selectively couple and decouple one of the power rail and the ground rail to and from the respective one of logic circuits 24.

In one aspect, the switch cells may be headswitches positioned between a voltage supply provided by the power rail and respective ones of logic circuits 24A-24N to couple the respective ones of logic circuits 24A-24N to the power rail. In another aspect, the switches may be footswitches positioned between respective ones of logic circuits 24A-24N and respective ground nodes of the ground rail (represented by GND1-GND5 of FIG. 3A) to couple the respective ones of logic circuits 24A-24N to the ground rail. Although described for purposes of example with respect to headswitches and footswitches, power gating module 26 may comprise any type of circuit for which the amount of leakage current drawn from the power supply is substantially reduced.

Figure 3A:
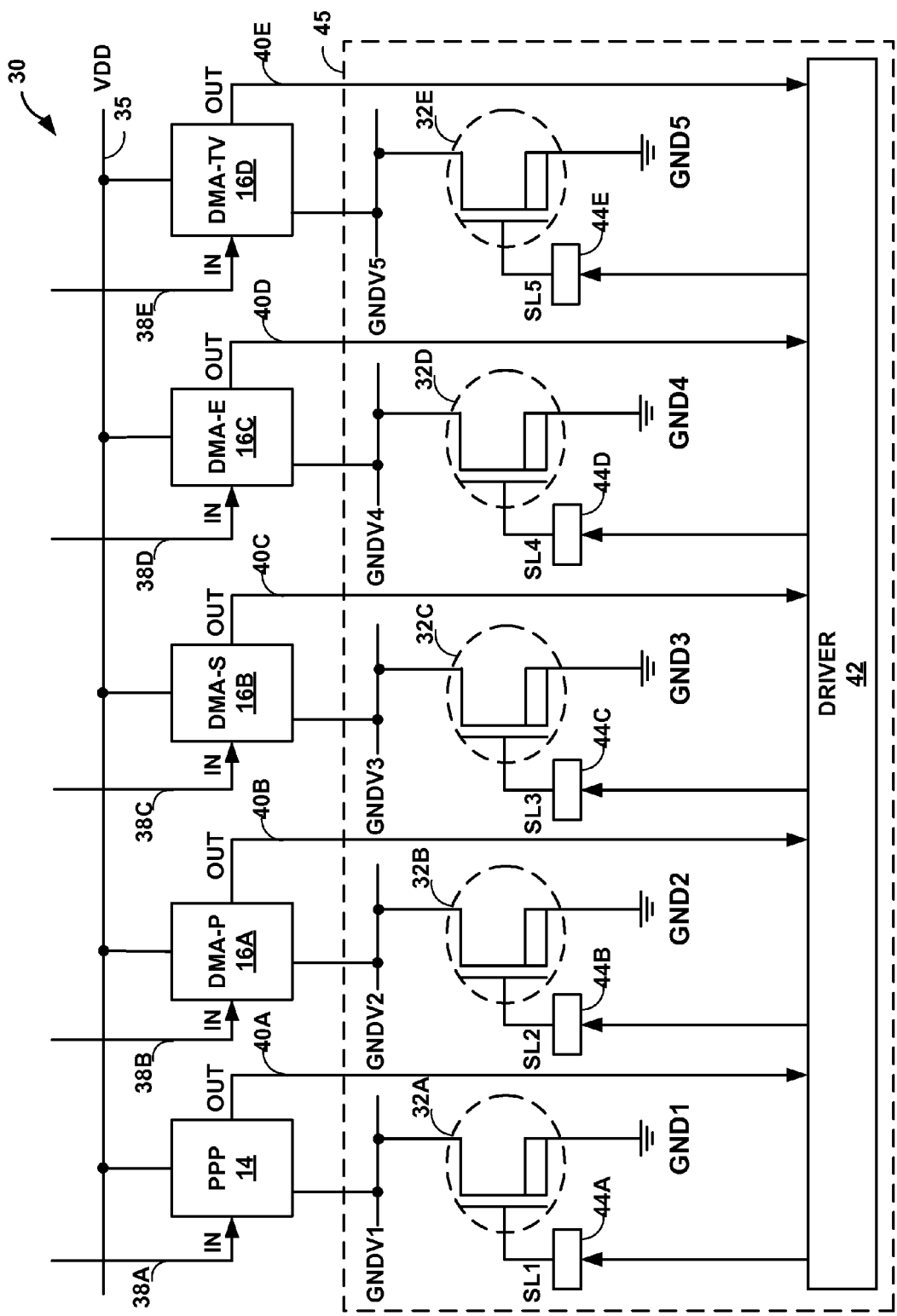
FIG. 3A is a circuit diagram illustrating an example multi-threshold CMOS (MTCMOS) circuit that employs footswitches within a multimedia display processor.

FIG. 3A is a circuit diagram illustrating an example multi-threshold CMOS (MTCMOS) circuit 30 that employs footswitches within a multimedia display processor. Circuit 30 forms part of a logic circuit in an integrated circuit such as an ASIC. Circuit 30 is configured to reduce the amount of leakage current in logic components with reduced supply and threshold voltages. Hence, circuit 30 may be particularly useful in circuits such as ASICs, which incorporate a large array of low voltage threshold (LVT) logic gates. As shown in FIG. 3A, each of PPP 14, DMA-P 16A, DMA-S 16B, DMA-E 16C, and DMA-TV 16D of MTCMOS circuit 30 is electrically coupled to the actual voltage supply VDD 35 provided by an external power rail. However, each of PPP 14, DMA-P 16A, DMA-S 16B, DMA-E 16C, and DMA-TV 16D is coupled to a separate "virtual" ground node GNDV, instead of actual ground nodes GND. Input signals (IN) 38A-38E ("input signals 38") respectively drive logic components PPP 14, DMA-P 16A, DMA-S 16B, DMA-E 16C, and DMA-TV 16D, which then respectively produce output signals (OUT) 40A-40E ("output signals 40").

Each of PPP 14, DMA-P 16A, DMA-S 16B, DMA-E 16C, and DMA-TV 16D is coupled to a respective one of footswitches 32A-32E ("footswitches 32") within power gating module 45. Footswitches 32 may each include high voltage threshold (HVT) or ultra high voltage threshold (UHVT) PMOS transistor that selectively connects and disconnects the respective virtual ground node GNDV to actual ground node GND depending on the operating mode of the respective logic component, i.e., depending on whether the logic component is in an active or inactive mode. Voltage supply VDD 35 is provided from an external terminal that is external to circuitry incorporating the logic components. Similarly, grounds GND are provided by an external ground terminal. Actual voltage supply VDD 35 and actual grounds GND of circuit 30 may be provided by a battery, plus any voltage regulation or power conditioning circuitry that may be applicable. For example, in a mobile phone, VDD 35 and GND may have a voltage difference between 0.5 and 2.0 volts.

Driver 42 of power gating module 45 applies sleep signals SL1-SL5 to footswitches 32 via respective input gates 44A-44E ("input gates 44") to independently turn the footswitches on and off and thereby couple and decouple the respective actual ground GND to and from the respective virtual ground GNDV. When one of footswitches 32 is turned on and, in effect, "closed," the respective virtual ground node GNDV is connected to the potential of the respective actual ground node GND, less a voltage drop across footswitch 32. Footswitches 32 permit respective logic components PPP 14, DMA-P 16A, DMA-S 16B, DMA-E 16C, and DMA-TV 16D to be powered by substantially the same voltage as if they were directly connected to actual ground GND in an active mode, but allows little or no current to flow across the respective logic component in an inactive mode, thereby reducing leakage current as well as current consumed by components that are not clock gated.

In particular, during a sleep or stand-by mode, a sleep signal SL at one of input gates 44A-44E is de-asserted to cause the respective one of footswitches 32 to turn off. The amount of leakage current drawn from VDD 35 in an inactive mode is reduced because footswitch 32 has a high threshold voltage and there is little or no current flowing through the respective logic component. In contrast, if footswitch 32 were not used during an inactive mode, the respective logic component would be electrically connected across the actual supply voltage VDD 35 and actual ground reference GND, and generate an undesirable amount of leakage current during the inactive mode.

Likewise, during an active mode, a sleep signal SL is asserted at one or a plurality of input gates 44A-44E, causing the respective one or plurality of footswitches 32 to turn on and couple the respective virtual ground GNDV to the respective actual ground GND, thereby powering the respective logic component for normal operation in an active mode. Therefore, during an active mode, the respective logic component of exemplary MTCMOS circuit 30 is powered by substantially the same voltage as if it were directly connected to both VDD 35 and GND. Thus, exemplary MTCMOS circuit 30 allows the threshold voltage of the respective logic component of the multimedia display processor to be lowered while reducing the amount of leakage current during inactive modes, as well as reducing current consumed by components that are not clock gated.

Driver 42 may selectively apply the sleep signals SL1-SL5 to turn the respective footswitches 32 off in response to receiving one or more interrupt commands or other messages from PPP 14, DMAs 16, or a daemon process (i.e., a background computer program) that monitors status of PPP 14 and DMAs 16, that indicates that PPP 14 or one or more of DMAs 16 is idling. In some aspects, driver 42 may apply a sleep signal upon receiving an interrupt command. In other aspects, driver 42 may, upon receiving an interrupt command, first check whether another task is pending for the respective logic component before applying the sleep signal. Driver 42 may selectively apply the sleep signals SL1-SL5 to turn the respective footswitches 32 on in response to receiving one or more messages from the daemon process that indicates that PPP 14 or one or more of DMAs 16 has received a new task and needs to be turned back on. The daemon process may listen for activity by PPP 14, DMAs 16 to determine whether the logic components 14, 16 are idling, and may also periodically check a register for the presence of a new task. Alternatively, driver 42 may intercept a task to PPP 14 or DMAs 16 from an upper layer software module, and selectively apply the sleep signals SL1-SL5 to turn the respective footswitches 32 on in response to intercepting the task.

In this manner, driver 42 of power gating module 45 may activate footswitches 32 individually to gate power to individual logic components of circuit 30. For example, driver 42 could activate footswitch 32A to power PPP 14 separately from DMAs 16. Driver 42 could activate footswitches 32B-32E to power DMAs 16 as a group, independently of PPP 14. Alternatively, driver 42 could power DMAs 16 separately.

The voltage drop across footswitches 32 may be minimal when the footswitches are on, and the SL signals at gate inputs 44 may be ramped up over time so as not to substantially affect other circuits running off of VDD 35. At initial power-on, all footswitches 32 may be on by default. However, only the footswitches 32 involved in a warm boot will be on by default after a power reset, i.e., warm boot. Following a warm boot, software associated with driver 42 can then program registers to turn on the footswitches 32 to establish power rails and reset the footswitches 32. In some aspects of this disclosure, the individual footswitches 32 may be independently reset as needed to power up different operations or applications. In this manner, the overhead for power up after a power collapse can be optimized.

In some aspects, headswitches may be used in place of, or in combination with, footswitches 32 with little or no effect to core area within circuit 30. In such aspects, headswitches are distributed below VDD 35, and are connected to respective logic components 14, 16.

A multimedia processor may be assembled that includes circuit 30 of FIG. 3A. For example, a logic circuit may be formed to include a first block for independently processing first multimedia processing tasks and a second block for independently processing second multimedia processing tasks. A power source that generates power for the first and second blocks may be formed, and a power gating module that selectively couples and decouples the first block to and from the power source independently of the second block may also be formed. In some aspects the power gating module may be formed by forming a first switch cell associated with the first block, forming a second switch cell associated with the second block, and forming a driver module that independently controls the first and second switch cells to selectively couple and decouple the first block and the second block to and from the power. The power source may be formed by forming a power rail in communication with the first block and the second block, and forming a ground rail in communication with the first block and the second block, wherein the power gating module is formed to independently control the first and second switch cells to selectively couple and decouple one of the power rail and the ground rail to and from the respective block. The multimedia processor may be formed as part of a hard macro core within an application specific integrated circuit (ASIC) or system on a chip (SOC). The multimedia processor may be formed by using standard lithographic or die packaging techniques.

Figure 3B:
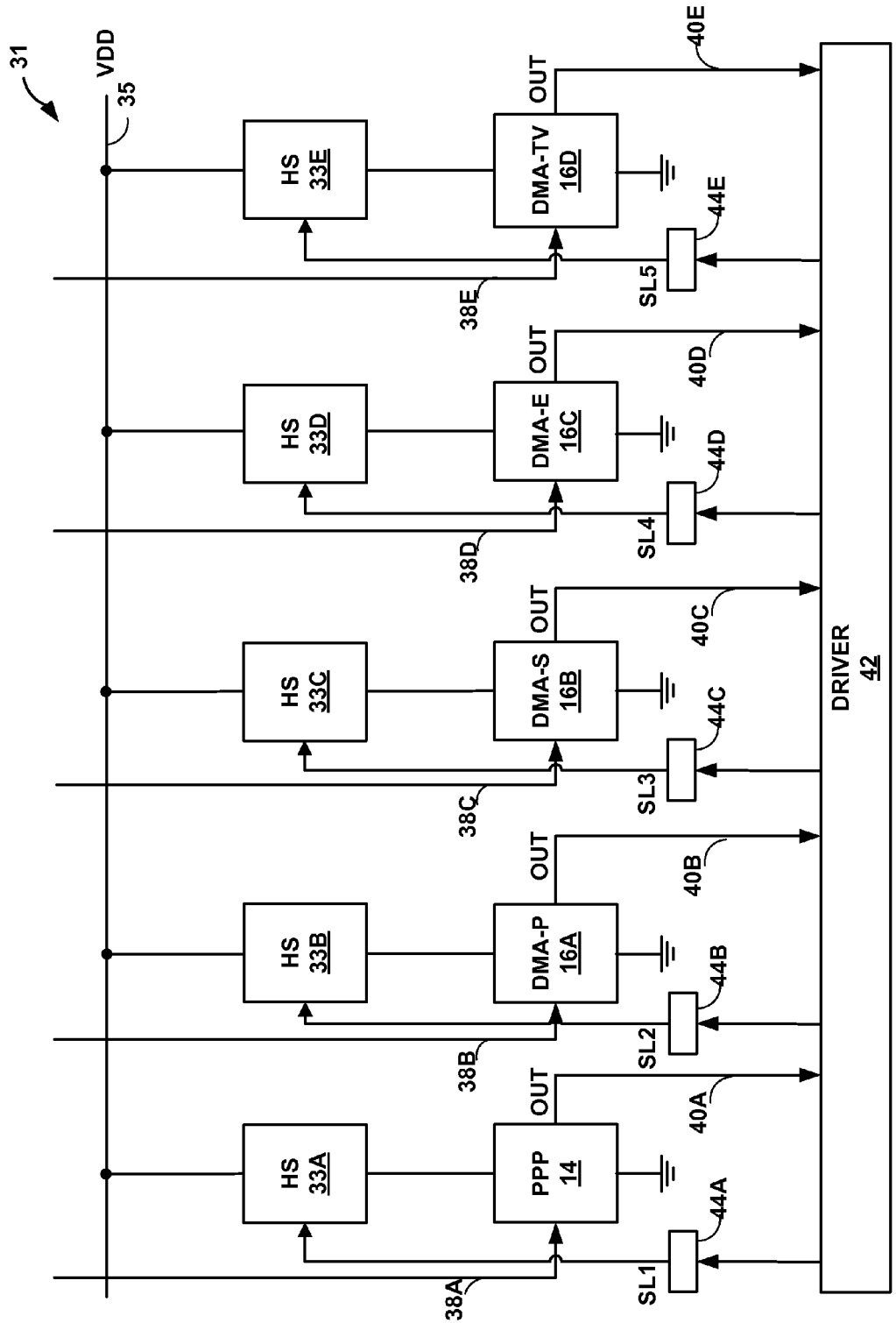
FIG. 3B is a circuit diagram illustrating an example circuit that employs headswitches within a multimedia display processor.

FIG. 3B is a circuit diagram illustrating an example circuit 31 that employs headswitches 33A-33E (HS 33) within a multimedia display processor. The example of FIG. 3B is substantially similar to that of FIG. 3A, except that the example of FIG. 3B employs the use of headswitches instead of footswitches 32 of FIG. 3A. In the example of FIG. 3B, each of headswitches 33 receives a corresponding one of sleep signals SL1-SL5 to independently turn headswitches 33 on and off and thereby selectively couple and decouple the headswitch to VDD. Headswitches 33 permit respective logic components PPP 14, DMA-P 16A, DMA-S 16B, DMA-E 16C, and DMA-TV 16D to be powered by substantially the same voltage as if they were directly connected to VDD in an active mode, but allows little or no current to flow across the respective logic component in an inactive mode, thereby reducing leakage current as well as current consumed by components that are not clock gated.

Figure 4A:
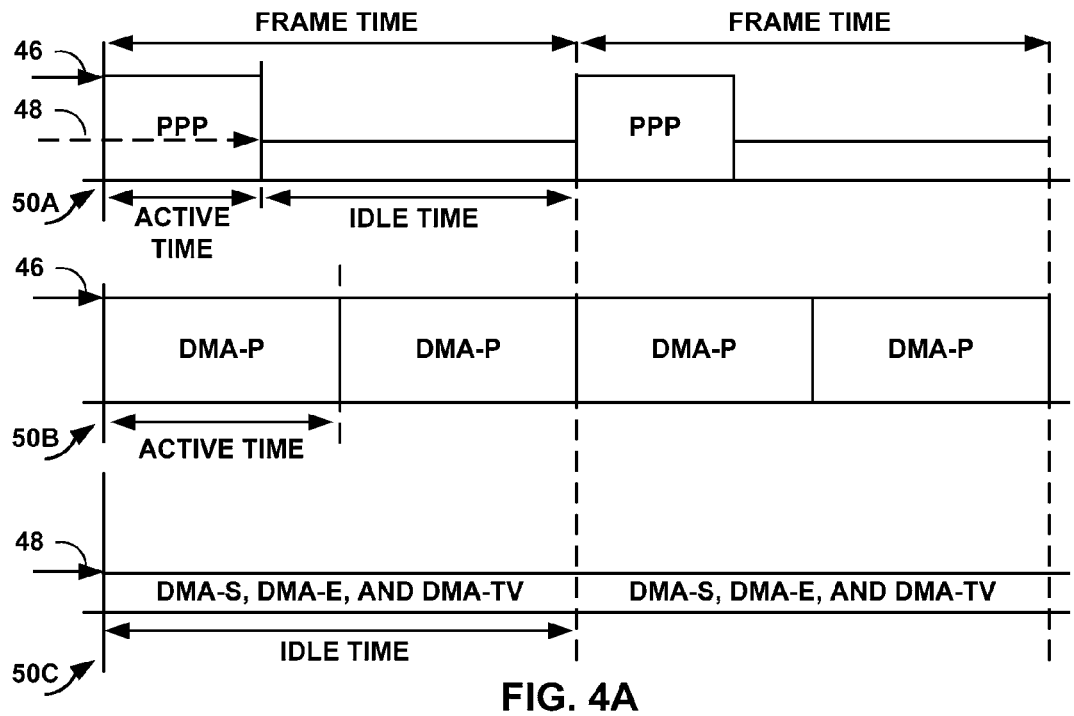
FIGS. 4A and 4B are block diagrams illustrating example power dissipation profiles of components of multimedia display processor over example frame times.
Figure 4B:
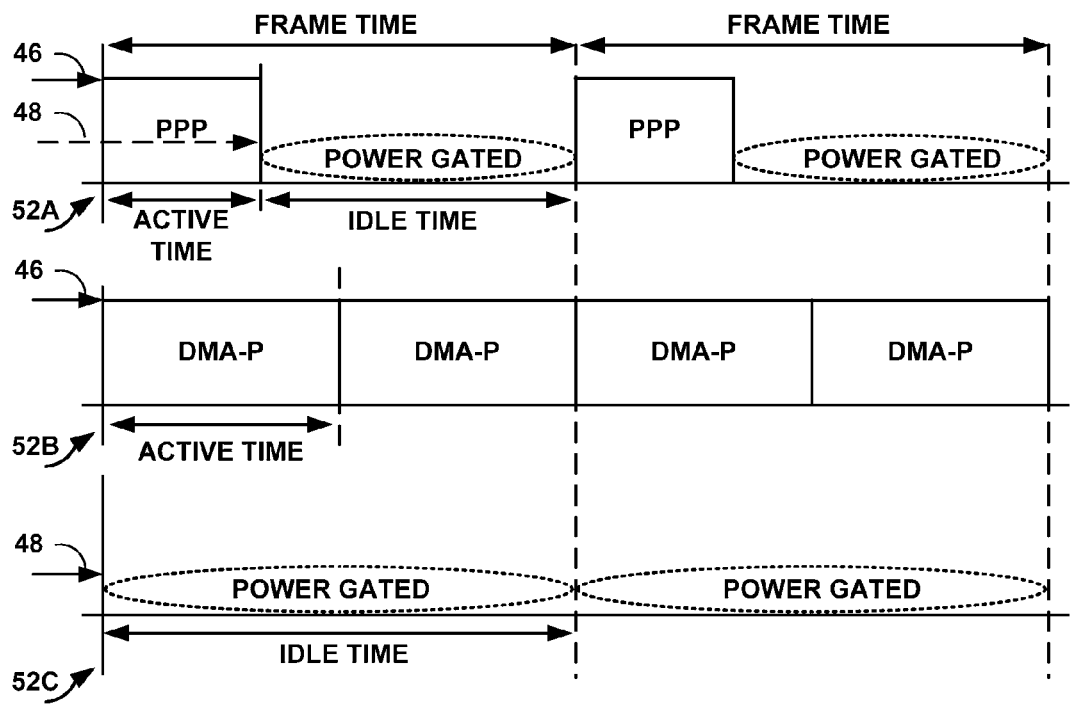

FIGS. 4A-4B are block diagrams illustrating example power dissipation profiles of components of a multimedia display processor over example frame times. For purposes of comparison, FIG. 4A illustrates a power dissipation profile over frame time without employing the independent power gating techniques described herein. In contrast, FIG. 4B illustrates a power dissipation profile over frame time while employing the power gating techniques to individual components of multimedia display processor 10, as described herein.

Profiles 50A and 52A illustrate power dissipation profiles for PPP 14. As shown in FIGS. 4A and 4B, PPP 14 operates at an active power level 46 during an active time, and at an inactive power level 48 during an idle time. Profile 50A illustrates that power is dissipated when PPP 14 is left idling without power gating enabled, while profile 52A illustrates that power to PPP 14 is gated when PPP 14 is idling, thereby reducing leakage current and current consumed by components that are not clock gated.

Profiles 50B and 52B illustrate power dissipation profiles for DMA-P 16A. In this example, DMA-P 16A operates at an active power level 46 at all times during frame time. Since DMA-P 16A always remains on, power is not gated to DMA-P 16A in this example.

Profiles 50C and 52C illustrate power dissipation profiles for DMA-S 16B, DMA-E 16C, and DMA-TV 16D. In the example of FIGS. 3A and 3B, DMAs 16B-16D are idle during these frame times. Profile 50C shows that DMAs 16B-16D are at an inactive power level 48 when idle. In contrast, profile 52C indicates that DMAs 16B-16D have power gated, and so are not running at the inactive power level 48 when gated. Although shown for purposes of example as a single power dissipation profile, each of DMA-S 16B, DMA-E 16C, and DMA-TV 16D may be independently active and idle, and may independently have power gated during idle time. For example, as mentioned above, DMAs 16 may have different display update rates.

Figure 5A:
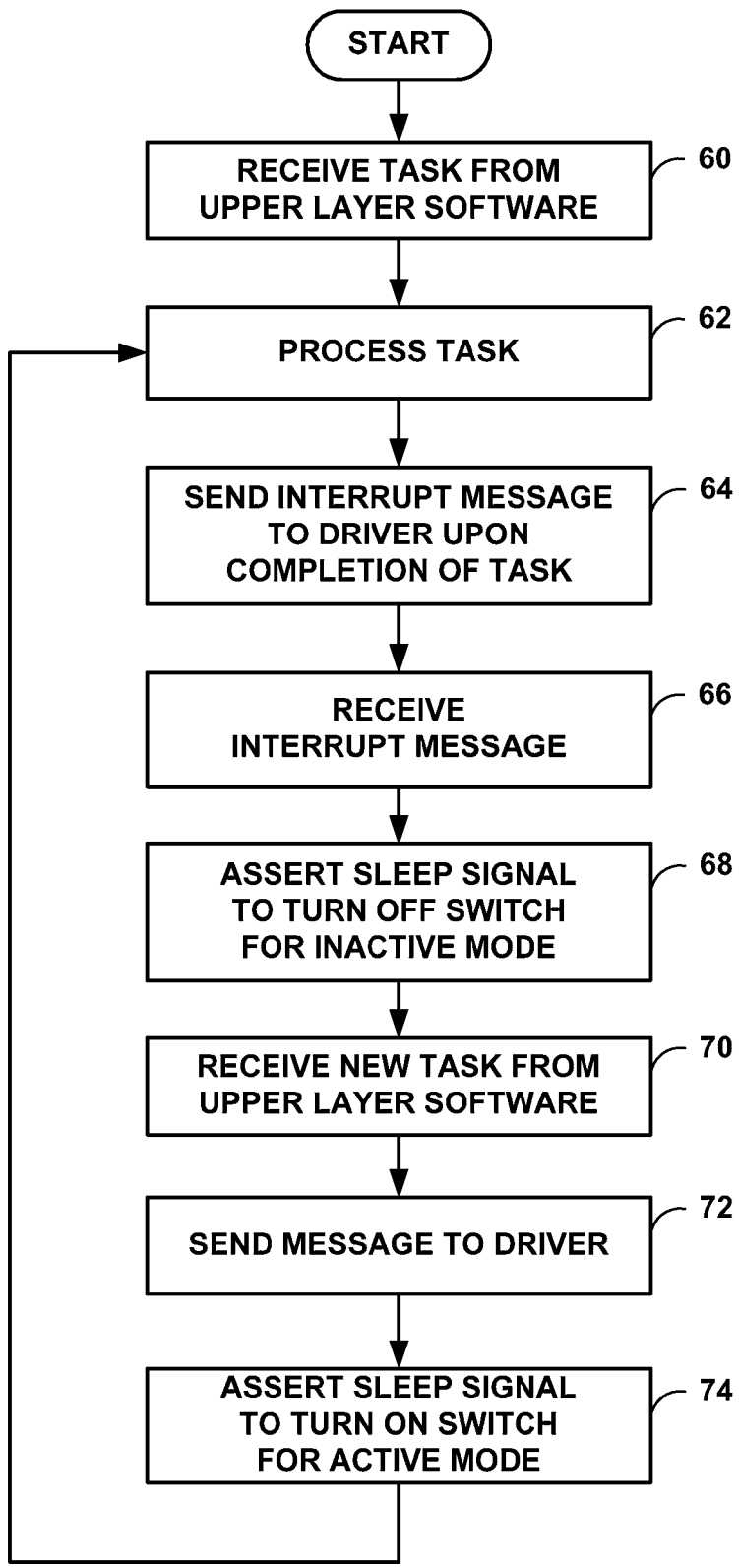
FIG. 5A is a flowchart illustrating one example operation of a multimedia display processor in using switches to selectively gate power to separate components of the multimedia display processor.

FIG. 5A is a flowchart illustrating one example operation of multimedia display processor 10 in using switches to selectively gate power to separate components of multimedia display processor 10. One of logic components 14, 16 of multimedia display processor 10 may receive a task from upper layer software (60). For example, PPP 14 may receive a task to integrate multimedia objects into a single frame buffer. PPP 14 processes the task (62), and sends an interrupt message to driver 42 (FIG. 3A) as an output signal 40A upon completion of the task (64). When driver 42 receives the interrupt message from PPP 14 (66), driver 42 asserts a sleep signal SL1 via input gate 44A to turn off footswitch 32A, thereby independently gating power to PPP 14 (68). This stops current from flowing across PPP 14 in an inactive mode, thereby reducing leakage current and current consumed by components that are not clock gated.

When PPP 14 is assigned a new task from upper layer software (70), a daemon process may detect the new task and send a message to driver 42 indicating to turn PPP 14 back on (72). Upon receipt of the message, driver 42 asserts a sleep signal SL1 via input gate 44A to turn on footswitch 32A (74), allowing current to flow through PPP 14 once again. Alternatively, driver 42 may intercept the new task and determine that PPP 14 should be turned on.

Figure 5B:
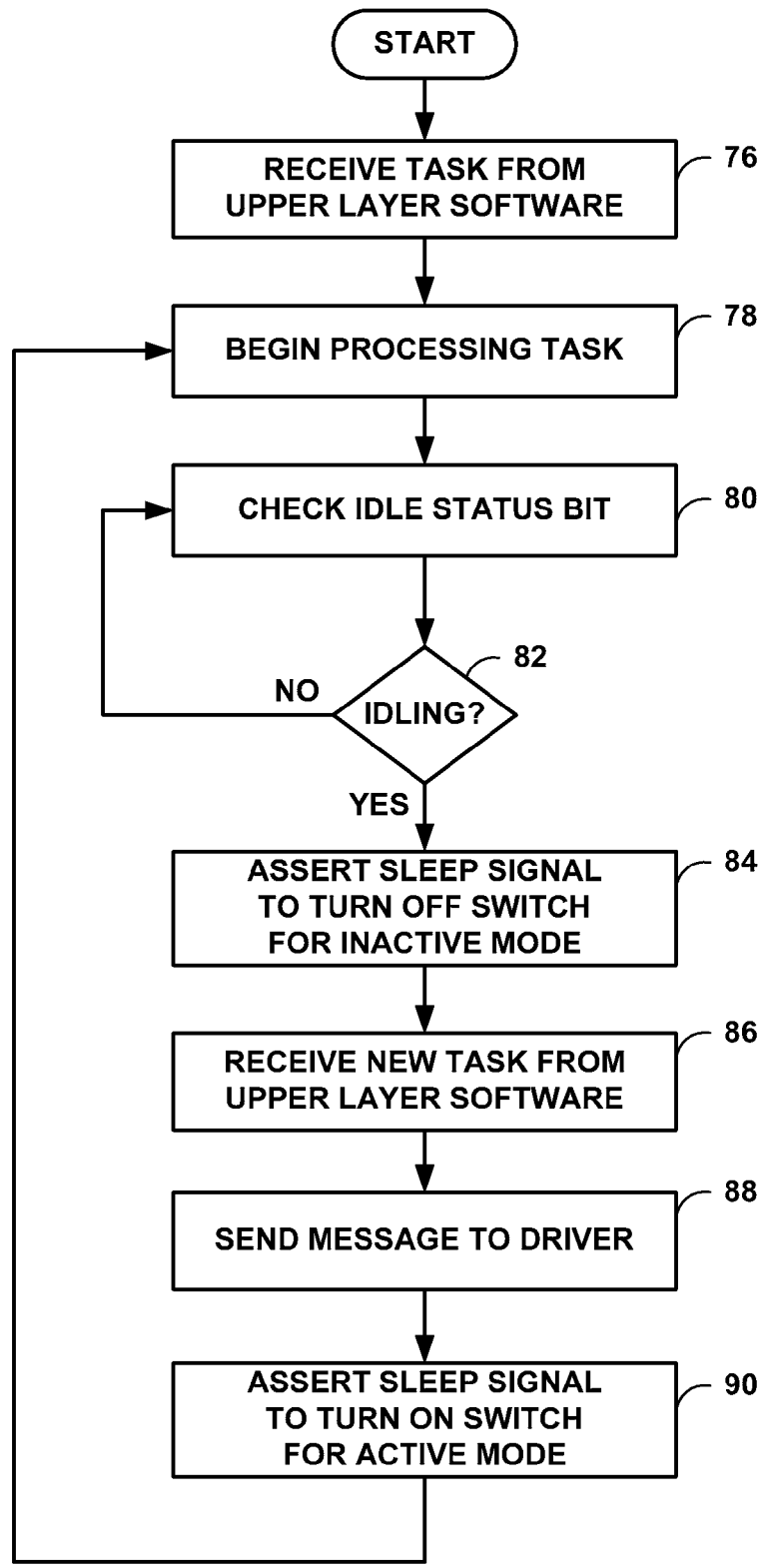
FIG. 5B is a flowchart illustrating another example operation of a multimedia display processor in using switches to selectively gate power to separate components of the multimedia display processor.

FIG. 5B is a flowchart illustrating another example operation of multimedia display processor 10 in using switches to selectively gate power to separate components of multimedia display processor 10. As above, one of logic components 14, 16 of multimedia display processor 10 may receive a task from upper layer software (76). For example, DMA-TV 16D may receive a task to access the frame buffer and send it to a TV display. DMA-TV 16D begins processing the task (78). Driver 42, or an intermediate intelligence layer within power gating module 45 above the driver layer (e.g., a daemon process), may check an idle status bit in a software register for DMA-TV 16D to check whether DMA-TV 16D is idle (80). A separate bit may be maintained for each of logic components 14, 16.

When the idle status bit indicates that DMA-TV 16D is not idle (NO branch of 82), driver 42 or the intermediate intelligence layer may wait a time period before checking the idle status bit again. Driver may determine that the idle status bit indicates that DMA-TV 16D is idle, i.e., DMA-TV 16D has finished processing the task (YES branch of 82). For example, driver 42 or the daemon process may make the determination after a single positive check of the idle status bit, or may make the determination after the component is found to be idle for at least a time period (e.g., after multiple positive checks). When driver 42 determined that DMA-TV 16D is idling (YES branch of 82), driver 42 asserts a sleep signal SL5 via input gate 44E to turn off footswitch 32E, thereby independently gating power to DMA-TV 16D (84). This stops current from flowing across DMA-TV 16D in an inactive mode, thereby reducing leakage current as well as current consumed by components that are not clock gated.

When DMA-TV 16D is assigned a new task from upper layer software (86), a daemon process may detect the new task and send another message to driver 42 (88). Upon receipt of the message, driver 42 asserts a sleep signal SL5 via input gate 44E to turn on footswitch 32E (90), allowing current to flow through DMA-TV 16D once again. Alternatively, driver 42 may intercept the new task and determine that DMA-TV 16D should be turned on.

Figure 6:
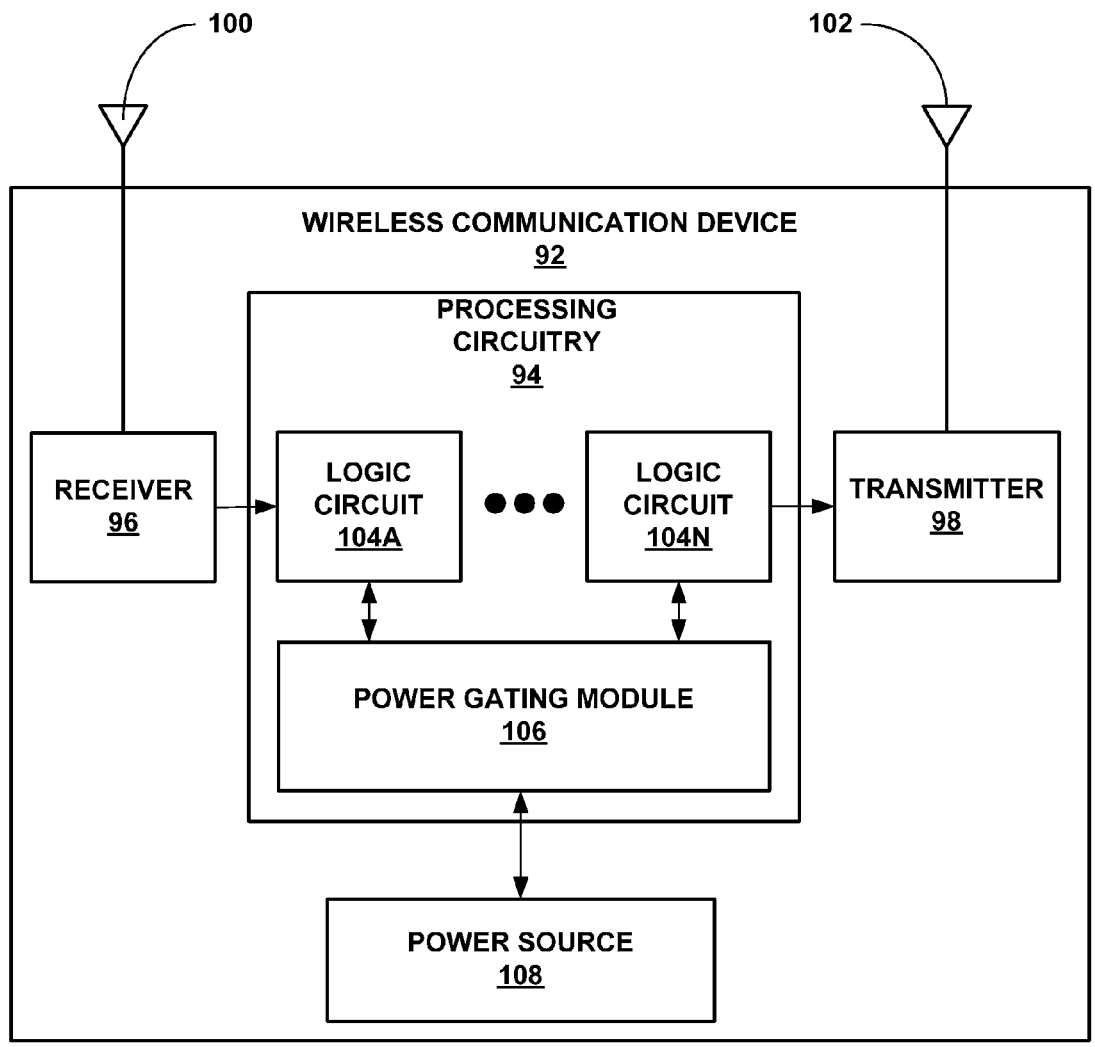
FIG. 6 is a block diagram illustrating an electronic device incorporating a logic circuit as described in this disclosure.

FIG. 6 is a block diagram illustrating an example electronic device incorporating a processing circuitry as described in this disclosure. In the example of FIG. 6, the electronic device is a wireless communication device 92 such as a mobile telephone. As shown in FIG. 6, wireless communication device 92 includes processing circuitry 94, a receiver 96 and a transmitter 98. Receiver 96 receives wireless signals via antenna 100, and transmitter 98 transmits wireless signals via antenna 102. In some aspects, receiver 96 and transmitter 98 may use a common antenna, e.g., via a duplexer.

Processing circuitry 94 include a plurality of logic circuits 104A-104N ("logic circuits 104") to drive transmitter 98 and process signals received by receiver 96. Processing circuitry 94 may operate in a manner consistent with multimedia processing circuitry 22 of FIG. 2, or may include multimedia display processor 10 of FIG. 1. Alternatively or additionally, processing circuitry 94 may incorporate typical wireless modem functionality, and may also be equipped to control various functions within wireless communication device 92, such as user interface functions. Power gating module 106 selectively and independently connects logic cells within logic circuits 104 to an external power source 108, such as a battery and appropriate power conversion circuitry. Power gating module 106 may include, for example, headswitch or footswitch circuitry elements. Power gating module 106 may also include a driver to control operation of the headswitch or footswitch circuitry elements.

As described in this disclosure, power gating module 106 independently connects the logic cells to an external power terminal or an external ground reference of power source 108 in order to place the logic cells in active or inactive modes on a selective, independent basis.

Various aspects and examples have been described. However, modifications can be made to the structure or techniques of this disclosure without departing from the scope of the following claims. For example, other types of devices could also implement the power management techniques described herein. These and other aspects of the disclosure are within the scope of the following claims.

The invention claimed is:
1. A multimedia processor comprising:
  a first block comprising a pixel processing pipe (PPP) for processing first multimedia processing tasks at a first rate comprising a frame composition rate;

a second block comprising a direct memory access (DMA) block for processing second multimedia processing tasks at a second rate comprising a display update rate, wherein the second multimedia processing tasks include transferring frame buffer images from a memory to a display;

a power source that provides power for the first and second blocks; and a power gating module that selectively couples and decouples the first block to and from the power source based on the first rate, independently of the second block.

2. The multimedia processor of claim 1, wherein the power gating module includes:

a first switch cell associated with the first block;

a second switch cell associated with the second block; and a driver module that independently controls the first and second switch cells to selectively couple and decouple the first block and the second block to and from the power.

3. The multimedia processor of claim 2, wherein the power source includes a power rail disposed adjacent the first block and the second block, and a ground rail coupled to the first block and the second block, and wherein the power gating module independently controls the first and second switch cells to selectively couple and decouple one of the power rail and the ground rail to and from the respective block.

4. The multimedia processor of claim 1, wherein the second block comprises a plurality of sub-blocks, and wherein the second block selects one of the sub-blocks for processing a given multimedia processing task.

5. The multimedia processor of claim 1, wherein the power gating module includes a first footswitch and a second footswitch to connect and disconnect a ground rail of the power source to and from the respective one of the first block and the second block.

6. The multimedia processor of claim 1, wherein the power gating module includes a first headswitch and a second headswitch to connect and disconnect a power rail of the power source to and from the respective one of the first block and the second block.

7. The multimedia processor of claim 1, wherein at least one of the first block and the second block includes a low voltage threshold logic gate, and wherein the power gating module includes high voltage threshold switches.

8. The multimedia processor of claim 1, wherein the first multimedia processing tasks include pixel processing tasks.

9. The multimedia processor of claim 1, wherein the DMA block comprises a plurality of sub-blocks including at least two or more of: a primary DMA (DMA-P), a secondary DMA (DMA-S), an external DMA (DMA-E), and a television DMA (DMA-TV).

10. The multimedia processor of claim 1, wherein the first rate at which the first block processes the first multimedia processing tasks is different from the second rate at which the second block processes the second multimedia processing tasks.

11. The multimedia processor of claim 1, wherein the power gating module independently couples and decouples the power source to one or more of the first and second blocks based on whether the first and second blocks are respectively idling.

12. The multimedia processor of claim 1, wherein the power gating module decouples the power source from the first block while the first block is idling, and wherein the power gating module couples the power source to the second block while the second block is active.

13. A wireless communication device comprising:

a wireless transmitter;

a wireless receiver; and a processing circuit to drive the transmitter and process signals received by the wireless receiver, the processing circuit including a multimedia display processor having a first block comprising a pixel processing pipe (PPP) for processing first multimedia processing tasks at a first rate comprising a frame composition rate, a second block comprising a direct memory access (DMA) block for processing second multimedia processing tasks at a second rate comprising a display update rate, wherein the second multimedia processing tasks include transferring frame buffer images from a memory to a display, a power source that provides power for the first and second blocks, and a power gating module that selectively couples and decouples the first block to and from the power source based on the first rate, independently of the second block.

14. The wireless communication device of claim 13, wherein the power gating module includes a headswitch to independently couple and decouple the power source to the respective one of the first and second blocks.

15. The wireless communication device of claim 13, wherein the power gating module includes a footswitch to independently couple and decouple the power source to the respective one of the first and second blocks.

16. The wireless communication device of claim 13, wherein the power gating module independently couples and decouples the power source to one or more of the first and second blocks based on whether the first and second blocks are respectively idling.

17. A method for assembling a multimedia processor, the method comprising:

forming a logic circuit including a first block comprising a pixel processing pipe (PPP) for independently processing first multimedia processing tasks at a first rate comprising a frame composition rate and a second block comprising a direct memory access (DMA) block for independently processing second multimedia processing tasks at a second rate comprising a display update rate, wherein the second multimedia processing tasks include transferring frame buffer images from a memory to a display;

forming a power source that provides power for the first and second blocks; and forming a power gating module that selectively couples and decouples the first block to and from the power source based on the first rate, independently of the second block.

18. The method of claim 17, wherein forming the power gating module includes:

forming a first switch cell associated with the first block;

forming a second switch cell associated with the second block; and forming a driver module that independently controls the first and second switch cells to selectively couple and decouple the first block and the second block to and from the power source.

19. The method of claim 18, wherein forming the power source includes:

forming a power rail in communication with the first block and the second block, and forming a ground rail in communication with the first block and the second block, wherein the power gating module is formed to independently control the first and second switch cells to selectively couple and decouple one of the power rail and the ground rail to and from the respective block.

20. The method of claim 19, wherein each of the switch cells includes a headswitch to couple and decouple the power rail to the first and second blocks.

21. The method of claim 19, wherein each of the switch cells includes a footswitch to couple and decouple the ground rail to the first and second blocks.

22. The method of claim 17, wherein the first block comprises the pixel processing pipe (PPP) for performing pixel processing.

23. A multimedia processor comprising:
means for processing first multimedia processing tasks at a first rate comprising a frame composition rate;
means for processing second multimedia processing tasks at a second rate comprising a display update rate, wherein the second multimedia processing tasks include transferring frame buffer images from a memory to a display;
means for generating power for the means for processing first multimedia processing tasks and the means for processing second multimedia processing tasks; and
means for selectively coupling and decoupling the means for processing first multimedia processing tasks to and from the means for generating power based on the first rate, independently of the means for processing second multimedia processing tasks.

24. The multimedia processor of claim 23, wherein the means for generating power includes:
first means for switching associated with the means for processing first multimedia processing tasks;
second means for switching associated with the means for processing second multimedia processing tasks; and
means for independently controlling the first means for switching and the second means for switching to selectively couple and decouple the means for processing first multimedia processing tasks and the means for processing second multimedia processing tasks to and from the means for generating power.

25. The multimedia processor of claim 24, wherein the means for generating power includes a power rail in communication with the means for processing first multimedia processing tasks and the means for processing second multimedia processing tasks, and a ground rail in communication with the means for processing first multimedia processing tasks and the means for processing second multimedia processing tasks, and wherein the means for selectively coupling and decoupling comprises means for independently controlling the first means for switching and the second means for switching to selectively couple and decouple one of the power rail and the ground rail to and from the respective means for processing.

26. The multimedia processor of claim 23, wherein the means for processing second multimedia processing tasks comprises a plurality of sub-blocks, and wherein the means for processing second multimedia processing tasks comprises means for selecting one of the sub-blocks for processing a given multimedia processing task.

27. The multimedia processor of claim 23, wherein the means for selectively coupling and decoupling includes a first footswitch and a second footswitch to connect and disconnect a ground rail of the means for generating power to and from the respective one of the means for processing first multimedia processing tasks and the means for processing second multimedia processing tasks.

28. The multimedia processor of claim 23, wherein the means for selectively coupling and decoupling includes a first headswitch and a second headswitch to connect and disconnect a power rail of the means for generating power to and from the respective one of the means for processing first multimedia processing tasks and the means for processing second multimedia processing tasks.

29. The multimedia processor of claim 23, wherein at least one of the means for processing first multimedia processing tasks and the means for processing second multimedia processing tasks includes a low voltage threshold means for logically gating, and wherein the means for selectively coupling and decoupling includes high voltage threshold means for switching.

30. The multimedia processor of claim 23, wherein the first multimedia processing tasks include pixel processing tasks.

31. The multimedia processor of claim 23, wherein the DMA pipe comprises a plurality of sub-blocks including at least two or/more of: a primary DMA (DMA-P), a secondary DMA (DMA-S), an external DMA (DMA-E), and a television DMA (DMA-TV).

32. The multimedia processor of claim 23, wherein the means for processing first multimedia processing tasks comprises means for processing the first multimedia processing tasks at a rate different from a rate at which the means for processing second multimedia processing tasks processes the second multimedia processing tasks.

33. The multimedia processor of claim 23, wherein the power gating module independently couples and decouples the power source to one or more of the first and second blocks based on whether the first and second blocks are respectively idling.

34. The multimedia processor of claim 23, wherein the means for selectively coupling and decoupling comprises:
means for decoupling the means for generating power to the means for processing first multimedia processing tasks while the means for processing first multimedia processing tasks is idling; and
means for simultaneously coupling the power source to the means for processing second multimedia processing tasks while the means for processing second multimedia processing tasks is active.

35. A computer readable storage medium comprising instructions for causing a multimedia processor to:
process first multimedia processing tasks in a first block at a first rate comprising a frame composition rate;
process second multimedia processing tasks in a second block at a second rate comprising a display update rate, wherein the second multimedia processing tasks include transferring frame buffer images from a memory to a display;
generate power for the first and second blocks; and
selectively couple and decouple the first block to and from the power based on the first rate, independently of the second block.

* * * * *